June 30, 1964  H. A. TINTES  3,139,222

UNIVERSAL SPREADER

Filed March 29, 1960

INVENTOR.
HUBERT A. TINTES
BY
John W. Adams
ATTORNEY 3,139,222
UNIVERSAL SPREADER
Hubert A. Tintes, West Fargo, N. Dak., assignor to West Fargo Manufacturing Co., West Fargo, N. Dak., a corporation
Filed Mar. 29, 1960, Ser. No. 18,424
1 Claim. (Cl. 222—328)

The present invention relates generally to improved fertilizer spreader attachments, and more particularly to a fertilizer spreader attachment which is arranged to uniformly disperse granules of fertilizer composition while being attached or mounted on various earth working or treating apparatus. For example, the apparatus of the present invention may be conveniently employed for use in connection with seed drills, harrows, or with various combination earth working equipment.

Fertilizer spreader attachments have been widely utilized in the past, however, they generally possess certain disadvantages particularly relative to the flow rate, which rate my vary depending upon various factors, particularly the degree to which the hopper is filled. When it is desired to provide for extremely steady flow, the mechanisms to achieve this have generally been sufficiently cumbersome so as to make cleaning of the assembly difficult. According to the present invention, steady discharge flow is achieved regardless of the degree to which the hopper is filled. In addition, cleaning of the unit is quite easily accomplished.

According ot the present invention, a fertilizer spreader attachment is provided having a hopper, a metering chamber communicating with said hopper, and discharge ports communicating with said metering chamber. Means are provided in the metering chamber for moving the fertilizer granules from the blind ports which communicate between the hopper per se and the metering chamber to the discharge ports. The blind ports are so designated because of the inability of the materials to flow on their own accord between the area of the metering chamber adjacent to the blind port over to the discharge port opening. The moving means preferably utilize an auger or the like which is capable of being driven at various desired rates of speed and which is closely confined within the walls of the metering chamber.

It is an object of the present invention therefor to provide an improved fertilizer spreader apparatus, the spreader being particularly arranged to provide positive delivery of granulated fertilizer from the apparatus, the delivery being at any desired rate of speed.

It is a further object of the present invention to provide an improved fertilizer spreader which is arranged to deliver a steady flow of fertilizer therefrom, regardless of the degree to which the hopper is filled with the granulated fertilizer compound.

It is yet another object of the present invention to provide an improved fertilizer spreader assembly which is arranged to have easy access thereinto in order to make cleaning of the assembly a simple task.

Other and further objects of the present invention will become apparent to those skilled in the art upon a study of the following specification, appended claim and accompanying drawings in which:

Figure 1:
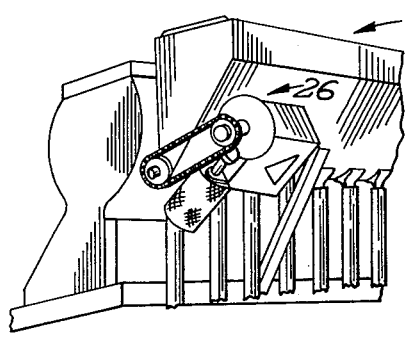
FIG. 1 is a perspective view of the improved fertilizer spreader attachment of the present invention, the apparatus including, in combination therewith, an adjustable mechanical drive assembly arranged to vary the discharge rate of the spreader assembly within desired limits.
Figure 2:
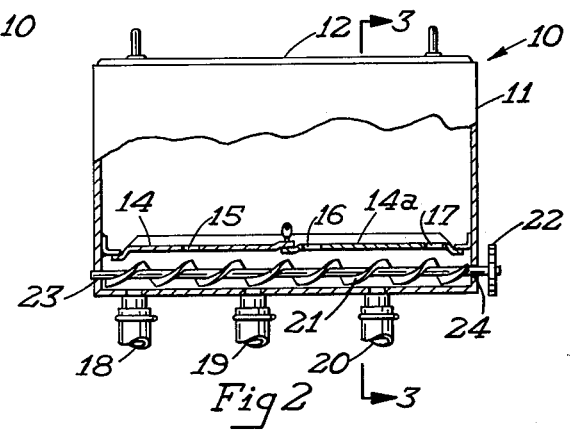
FIG. 2 is a vertical sectional view of a preferred embodiment of the present invention taken along the line and in the direction of the arrows 2—2 of FIG. 3, a portion of the apparatus being shown broken away.
Figure 3:
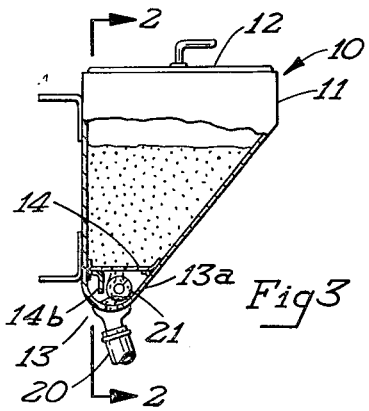
FIG. 3 is a vertical sectional view taken along the line and in the direction of the arrows 3—3 of FIG. 2.
Figure 4:
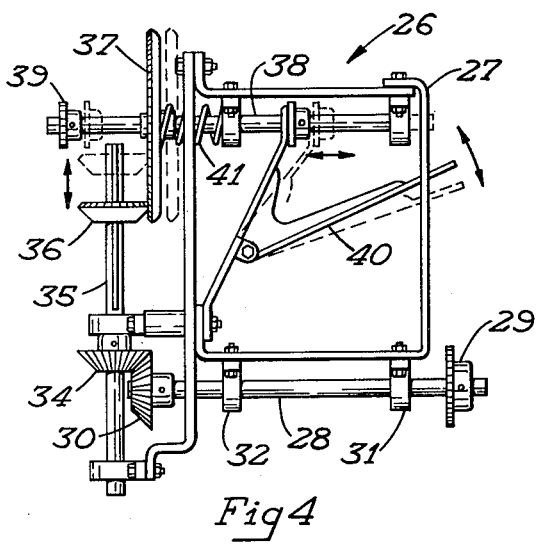
FIG. 4 is a top plan view of a drive assembly which is specifically designed for use in combination with the apparatus of the present invention, and showing, in phantom, the release mechanism in retracted position; and, FIG. 5 is a side view of the drive assembly taken with the drive sprocket 39 removed.
Figure 5:
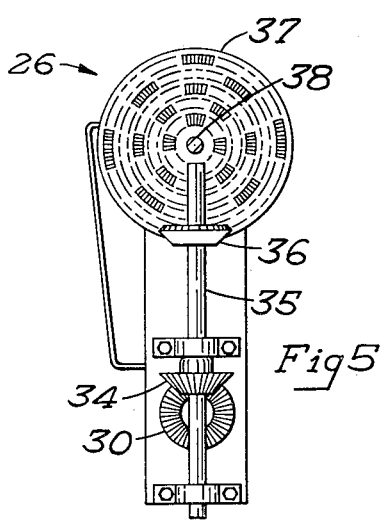

In accordance with the preferred modification of the present invention, the fertilizer spreader assembly generally designated 10 is provided with a hopper 11 including the cover member 12, the lower portion of the hopper communicating with a metering chamber generally designated 13. The metering chamber 13 includes separating plates 14 and 14A which are arranged to lie at the floor of the hopper 11, each including a plurality of blind ports 15, 16 and 17 therein. For most commercial grade field fertilizers, having a conventional particle size distribution, with particles not exceeding about ⅛", a metering chamber having a depth of about 1" is adequate to render the holes communicating between the hopper and the metering chamber substantially "blind" with respect to the offset delivery ports 18, 19 and 20. These holes are preferably about ½ inch square, being about 1" long and ½" wide. The metering chamber is further provided with means for controllably moving the fertilizer particles from the blind ports over to the appropriate discharge ports. This moving means is conveniently provided in the form of an auger 21 which is driven by means of chain sprocket 22, the auger shaft being mounted for rotation in the hopper walls through bearings 23 and 24. In order to control the speed at which the auger 21 rotates, an appropriate drive selecter means generally designated 26 as shown in detail in FIGS. 4–5 is provided. Accordingly, the individual fertilizer granules drop from the hopper into the metering chamber, and are moved therealong under the influence of the offset rotating auger 21. Upon reaching the appropriate discharge ports, normally the next adjacent thereto, the individual granules are discharged therefrom and distributed along the field, as desired. Baffle 14b provides a closely confined enclosure with plate 14 and the slanting wall 13A.

The drive selector assembly 26 includes a frame member 27 into which the apparatus is mounted. A main drive shaft generally designated 28 including a main driven gear 29 and a bevel gear 30 is provided with power from a suitable driven source. Bearings 31 and 32 are, of course, provided as required. The bevel gear 30 operates the second bevel gear 34 which is mounted along shaft 35, the oposite end thereof being provided with a splined bevel gear 36. Bevel gear 36 is arranged to be driven along any appropriate tooth channel arranged along the face thereof. Accordingly, it will be appreciated that the bevel gear 36 may be moved to-and-fro in order to modify the speed at which the shaft 38 is driven. Shaft 38, in addition to the selector gear 37, includes a main drive gear 39 and a disengaging lever 40. Lever 40 may be moved in the direction of the arrow, as indicated, thereby moving the selector gear 37 away from the bevel gear 36, this being accomplished against the force available through the resilient spring member 41. Accordingly, depending upon the position of the gear 36 relative to the selector gear plate 37, a multitude of different speeds are available for driving the shaft 38. This speed may be additionally appropriately varied by the proper selection of gears 39 and 22.

It will be observed that the drive mechanism may conveniently be disengaged when necessary for turning around, transporting the unit between operations, and the like. Therefore, the operator may control the unit from an on-off position simply by actuating the disengaging lever 40. The mere stopping of the shaft 21 is sufficient to prevent fertilizer from being dropped from the assembly, even though the hopper may be partially or completely filled.

Upon completion of the work, for example, at the end of the day, the operator may simply remove the plate 14 from the unit, the plate 14 possibly being divided into two segments, 14 and 14a for convenience. The metering chamber may be conveniently brushed out, and a clean spreader thereby made available for the next day's operation. Moisture, either in the form of rain, snow, or dew, will normally cause caking of the granulated fertilizer and thereby hinder the proper flow from the various spreader systems unless provision is made for cleaning the assembly. The present apparatus provides convenient means for cleaning the assembly and therefore renders it free from caking problems and the like.

Suitable mounting brackets are provided which enable operation in combination with any desired earth treating equipment. The mounting problems for any given piece of equipment are specific to the design of the equipment and are easily solved by those skilled in the art. Due to the arrangement existing in the apparatus of the present invention, the only strict requirement for the operation is that it be mounted substantially transversely horizontal.

The closely confined auger is desirable for the reasons that more positive delivery of material along the metering chamber is possible, and further to assist in rendering the parts 15, 16 and 17 distinctly blind. It will be further observed that the auger 21 is offset rearwardly toward the slanting wall 13A, thereby providing a drive-chamber having a top or receiving end which is larger or wider than the bottom or discharge end. Such an arrangement of a receiving end and a discharge end assists in providing continuous flow at a steady rate of speed.

It will be appreciated that various modifications of the present invention may be prepared without departing from the spirit and scope thereof. It will accordingly be understood that the specific examples given herein are for purposes of illustration only and are not to be construed as a limitation on the coverage to which the present invention is entitled.

I claim:

A fertilizer distributor for metering granular fertilizers through a plurality of discharge openings, said distributor comprising:
(a) a hopper;
(b) a metering chamber having a substantially uniform width and disposed below said hopper and having
(1) a bottom provided with a plurality of discharge openings therein;
(c) a removable multiple section separator panel supported on the bottom of said hopper and forming the top of said metering chamber, said panel sections having
(1) a pluarlity of feeder openings therethrough respectively out of register with the discharge openings in said metering chamber;
(2) a depending baffle mounted on said separator sections;
(d) auger means in said metering chamber with the side portion thereof disposed in close association to said depending baffle for carrying to said discharge openings the granules passing through said feeder openings and having a diameter smaller than the width of said chamber to provide substantial space at least along one side thereof to facilitate cleaning when the sections of said separator panel are removed, said depending baffle maintaining the material passing through the feeder openings in close association with said auger but being removable from the metering chamber with said separator sections to facilitate the cleaning of the chamber and auger.

References Cited in the file of this patent
UNITED STATES PATENTS

| | | |
|---|---|---|
| 857,195 | Packham | June 18, 1907 |
| 924,377 | Pierce | June 8, 1909 |
| 1,109,134 | Millard | Sept. 1, 1914 |
| 2,657,831 | Pierce | Nov. 3, 1953 |
| 2,668,638 | Joy | Feb. 9, 1954 |